UNITED STATES PATENT OFFICE.

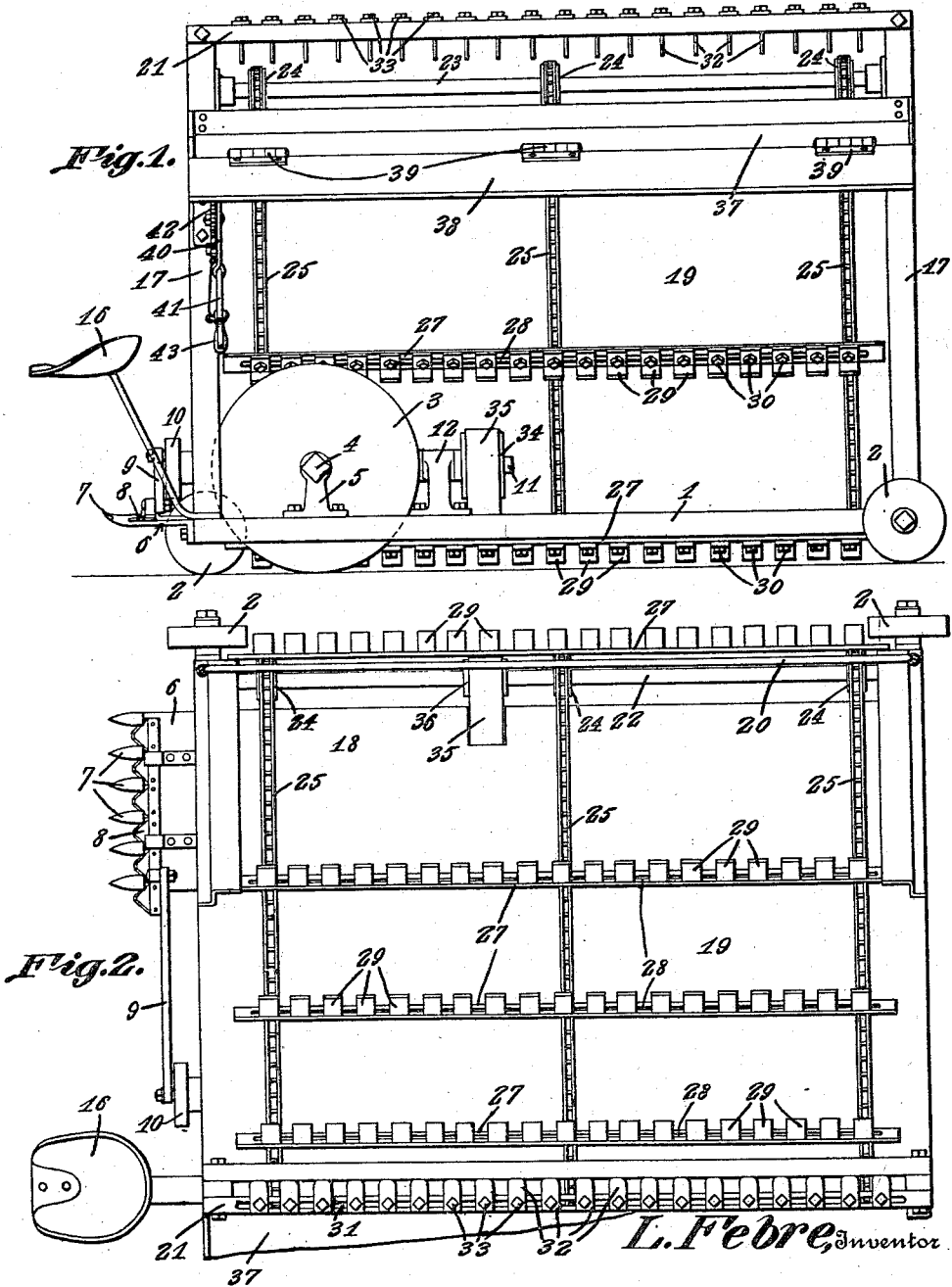

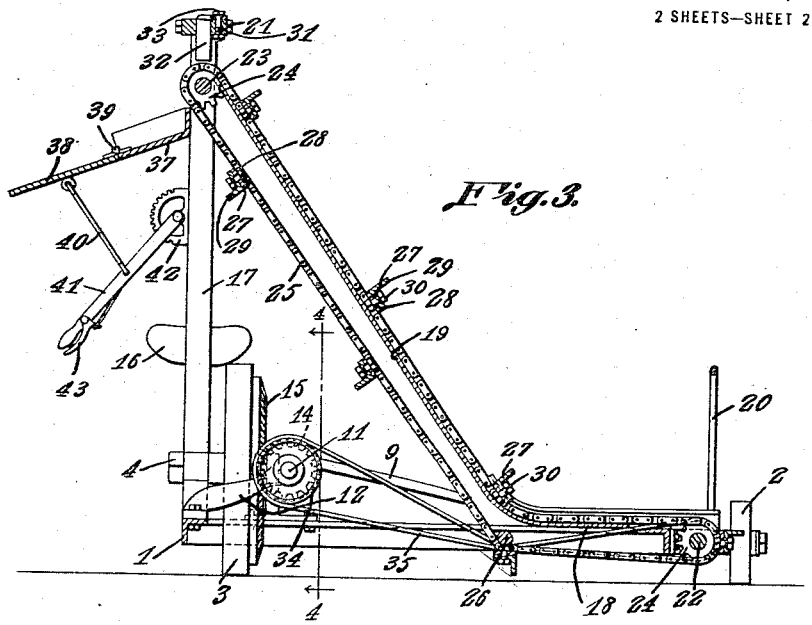
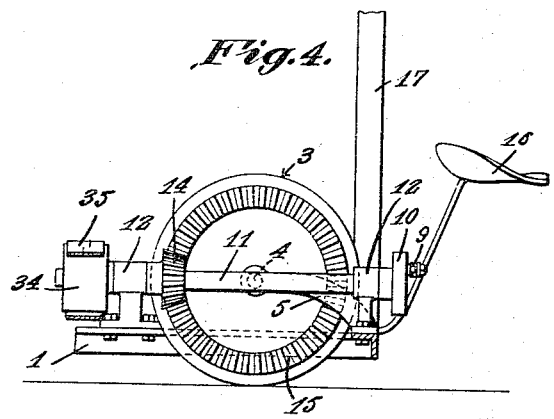

LEO FEBRE, OF NORFOLK, VIRGINIA.

CORN-CUTTER.

1,285,090.     Specification of Letters Patent.     Patented Nov. 19, 1918.

Application filed April 22, 1918. Serial No. 230,085.

*To all whom it may concern:*

Be it known that I, LEO FEBRE, a citizen of the United States, residing at Norfolk, in the county of Norfolk and State of Virginia, have invented a new and useful Corn-Cutter, of which the following is a specification.

The device forming the subject matter of this application is adapted to be employed for cutting down corn standing in the field, and for cutting up the corn into ensilage while the machine is proceeding across the field.

One object of the invention is to provide a simple but efficient structure wherein the result above mentioned may be achieved.

Another object of the invention is to provide novel means whereby the size of the ensilage as it is cut up, may be regulated.

Another object of the invention is to provide means whereby, at the will of an operator, the ensilage may be directed to a receiver of any kind, or be permitted to accumulate on the machine.

A further object of the invention is to provide novel means for driving the various movable elements of the structure.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Fig. 2 is a top plan wherein parts are broken away; Fig. 3 is a transverse section wherein parts appear in elevation; and Fig. 4 is a section taken approximately on the line 4—4 of Fig. 3.

In carrying out the present invention there is provided a main frame 1 supported upon its three corners by means of small ground wheels 2, the frame 1 being supported on its fourth corner by means of a relatively large ground wheel 3 carried by an axle 4 supported in suitable brackets 5 on the main frame 1. A platform 6 projects forwardly from the main frame 1 and is provided with fingers 7 in which a cutter 8 is mounted to reciprocate. The cutter 8 may be of any desired form and may be driven by any suitable mechanism. In the present instance, but not of necessity, a pitman 9 is pivoted to the cutter 8 and is pivoted to a crank disk 10 carried by a shaft 11 journaled in bearings 12 on the main frame 1.

The shaft 11 carries, as shown in Fig. 4, a beveled pinion 14 meshing into a gear 15 carried by the large ground wheel 3. Adjacent to the ground wheel 3, the main frame 1 is provided with a seat 16 for the driver or operator.

Fixed to the main frame 1 and upstanding therefrom at one side thereof is U-shaped auxiliary frame 17 including a top bar 21. The invention comprises a deck extended transversely of the machine and including a horizontal part 18 and an upwardly inclined part 19, the deck being carried by the main frame 1 and by the auxiliary frame 17. A U-shaped guide rail 20 is secured to the main frame 1 and upstands therefrom at the outer end of the horizontal part 18 of the deck. A bottom shaft 22 extends longitudinally of the machine and is journaled in the main frame 1 near to the outer end of the horizontal part 18 of the deck. A top shaft 23 is journaled in the auxiliary frame 17 near to the upper end thereof. Sprocket wheels 24 are secured to the shafts 22 and 23 and about the sprocket wheels are trained chains 25 inclosing the deck 17—18, the chains being sufficiently slack so that they may move along the upper surface of the parts 18 and 19 of the deck. Below the deck, the lower runs of the sprocket chains 25 may be engaged by an idle roller 26 mounted on the main frame 1. The chains 25 are connected by cross slats 27 having longitudinal slots 28. Fingers 29 are mounted on the slats 27 and are held to the slats by means of clamp bolts 30, adjustable longitudinally in the slot 28 of the slat 27. At this point it may be noticed that the top bar 21 of the auxiliary frame 17 is provided with a longitudinal slot 31. Cutters 32 depend from the top bar 21 of the auxiliary frame 17 and are held to the top bar by means of clamp bolts 33 which are adjustable in the slot 31. The chains 25, slats 27 and the fingers 29 constitute a belt conveyer, and in practical operation, the fingers 29 of this belt conveyer pass between the cutters 32 which are mounted on the top bar 21 of the auxiliary frame 17.

A pulley 34 is secured to the shaft 11 and about the pulley is trained a belt 35 engaged with a pulley 36 on the bottom shaft 22. A skilled mechanic will understand that, if desired, the belt 35 may be replaced by a sprocket chain, the pulleys 34 and 36 being replaced by sprocket wheels.

A downwardly inclined table 37 is secured to the auxiliary frame 17 and projects outwardly therefrom. An extension 38 is hinged at 39 to the table 37. A link 40 is pivoted to the extension 38 and is pivoted to a lever 41 fulcrumed on a segment 42 carried by the frame 17, the lever having a latch mechanism 43 adapted to coöperate with the segment.

In practical operation, when the structure hereinbefore described is drawn forwardly along the ground, the wheel 3 will be rotated, the gear 15 imparting rotation to the shaft 11 by means of the beveled pinion 14. When the shaft 11 is rotated, the crank disk 10 and the pitman 9 will cause a reciprocation of the cutter 8 in the finger 7. The standing corn encountered by the machine thus will be cut down, and will drop rearwardly onto the horizontal part 18 of the deck, the corn being directed onto the horizontal part of the deck by the guide rail 20. When the corn topples backwardly onto the horizontal part 18 of the deck, the corn is received by the conveyer chains 25 and is carried upwardly along the inclined part 19 of the deck by means of the slats 27 and the fingers 29. At this point it may be stated that the belt conveyer, including the chains 25 and the slats 27, is driven from the shaft 11 by means of the pulley 34, the belt 35, and the pulley 36 and on lower or bottom shaft 22, around which the belt conveyer extends.

The corn is carried upwardly by the fingers 29 as hereinbefore stated, and is forced across the cutters 32 on the top bar 21 of the auxiliary frame 17, the fingers 29 passing between the cutters 32. By this procedure, the corn is cut up into ensilage of the desired length. It is to be observed that by adjusting the space between the cutters 32, the length of the ensilage may be adjusted as occasion may demand, it being possible to shift the clamp bolts 33 in the slot 31 of the top bar 21. In order that the fingers 29 on the belt conveyer may pass between the cutters 32 on the fixed bar 21, the fingers may be separated any desired distance from each other, this result being brought about continuously by adjusting the bolts 30 in the slots 28 of the cross slats 27 which form parts of the conveyer.

The ensilage, having been cut up into the desired lengths, falls upon the table 37 and slides off the extension 38 into a vehicle (not shown) which may be driven alongside the machine forming the subject matter of this application. It may be desirable to permit the ensilage to collect, and then deposit the ensilage in piles on the ground. If it is desired to collect the ensilage in quantities, before dumping the ensilage on the ground or elsewhere, the extension 38 is swung upwardly by means of the lever 41 and the link 40, the latch mechanism 43 being engaged with the segment 42. By swinging the extension 38 into the position shown in Fig. 3, the collected ensilage may be permitted to run off.

Having thus described the invention, what is claimed is:—

1. In a device of the class described, a wheel-mounted frame; a corn cutter on the frame; a plurality of laterally spaced ensilage cutters fixed on the frame against rotation; and a movable conveyer receiving the corn from the corn cutter and advancing the corn against the fixed ensilage cutters to sever the corn by pressure derived directly from the conveyer while the corn is on the conveyer.

2. In a device of the class described, a wheel mounted frame; a corn cutter at the bottom of the frame; a relatively fixed ensilage cutting means at the top of the frame; an inclined conveyer receiving the corn from the cutter and advancing the corn against the ensilage cutting means; a table mounted on the frame and receiving the ensilage from the ensilage cutting means; a vertically swinging extension hinged to the outer edge of the table and constituting a prolongation of the table when the extension is in alinement with the table, the extension forming a retainer for the material on the table when the extension is swung upwardly; and means under the control of an operator for swinging the extension and for holding the extension at adjusted angles with respect to the table.

3. In a device of the class described, a wheel mounted frame; ensilage cutters movable for adjustment toward and away from each other on the frame; means for holding the ensilage cutters in adjusted positions with respect to each other on the frame; a corn cutter carried by the frame; a conveyer receiving the corn from the cutter and advancing the corn against the ensilage cutters; feeding fingers constituting a part of the conveyer and adapted to pass between the ensilage cutters; and means for mounting the fingers on the conveyer for adjustment toward and away from each other, to correspond with the distance between the ensilage cutters.

In testimony that I claim the foregoing as my own, I have hereto affixed my signature in the presence of two witnesses.

LEO FEBRE.

Witnesses:
H. F. SHOCKLEY,
GEORGE C. STANLEY.

Copies of this patent may be obtained for five cents each, by addressing the "Commissioner of Patents, Washington, D. C."